(12) United States Patent
Sumpter et al.

(10) Patent No.: US 12,450,612 B2
(45) Date of Patent: *Oct. 21, 2025

(54) SELF-SERVICE TERMINAL (SST) ITEM RETURN ANTI-FRAUD PROCESSING

(71) Applicant: NCR Voyix Corporation, Atlanta, GA (US)

(72) Inventors: Jodessiah Sumpter, Alpharetta, GA (US); Matthew Robert Burris, Lawrenceville, GA (US); Christopher John Costello, Suwanee, GA (US); Caleb Wayne Martinez, Fayetteville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/520,930

(22) Filed: Nov. 28, 2023

(65) Prior Publication Data

US 2024/0169359 A1 May 23, 2024

Related U.S. Application Data

(63) Continuation of application No. 17/152,064, filed on Jan. 19, 2021, now Pat. No. 11,836,735.

(51) Int. Cl.
*G06Q 20/40* (2012.01)
*G06Q 20/18* (2012.01)
(Continued)

(52) U.S. Cl.
CPC ........... *G06Q 20/407* (2013.01); *G06Q 20/18* (2013.01); *G06Q 20/208* (2013.01);
(Continued)

(58) Field of Classification Search
CPC .... G06Q 20/407; G06Q 20/18; G06Q 20/208; G06Q 20/4016; G06Q 30/0185;
(Continued)

(56) References Cited

U.S. PATENT DOCUMENTS

| 10,657,591 B1 * | 5/2020 | Chen ..................... G06Q 20/18 |
| 11,361,321 B2 | 6/2022 | Humphrys et al. |

(Continued)

FOREIGN PATENT DOCUMENTS

| CA | 3103822 A1 * | 8/2019 | ......... G06Q 30/0281 |
| EP | 2940637 A1 * | 11/2015 | ............ G06Q 20/18 |

(Continued)

OTHER PUBLICATIONS

FraudLabPro: What is Fraud Validation Rule? Oct. 10, 2018, Articles & Tutorials, pp. 1-5 (Year: 2018).*

(Continued)

*Primary Examiner* — Bijendra K Shrestha
(74) *Attorney, Agent, or Firm* — Schwegman Lundberg & Woessner, P.A.

(57) ABSTRACT

An item return transaction for an item is identified at a transaction terminal. The item is authenticated using multiple factors at least some of which are independent of item code identification for the item. A fraud score is calculated based on the multiple factors, item code identification, and data that is specific to a customer associated with the transaction, specific to the item, specific to a store associated with the transaction terminal, and specific to a retailer associated with the store. The fraud score and a customer-return grade for the customer are processed to determine whether the transaction can complete at the terminal without assistance or whether the transaction is to be held in abeyance for an audit (onsite audit or remote network-based audit). In an embodiment, the t terminal is a Self-Service Terminal (SST) and the transaction is a self-item return transaction conducted by a customer at the terminal.

16 Claims, 5 Drawing Sheets

(51) Int. Cl.
*G06Q 20/20* (2012.01)
*G06Q 30/018* (2023.01)
*G06T 7/62* (2017.01)
*G06T 7/90* (2017.01)
*G06K 7/14* (2006.01)

(52) U.S. Cl.
CPC ..... *G06Q 20/4016* (2013.01); *G06Q 30/0185* (2013.01); *G06T 7/62* (2017.01); *G06T 7/90* (2017.01); *G06K 7/1413* (2013.01); *G06K 7/1417* (2013.01)

(58) Field of Classification Search
CPC .............. G06Q 20/202; G06Q 20/206; G06Q 20/4014; G06T 7/62; G06T 7/90; G06K 7/1413; G06K 7/1417; G07F 7/06; G07G 1/14
See application file for complete search history.

(56) References Cited

U.S. PATENT DOCUMENTS

| | | | |
|---|---|---|---|
| 2015/0317628 A1 | 11/2015 | Rossmann | |
| 2018/0114228 A1* | 4/2018 | Singh | .................. G07G 1/0063 |
| 2019/0172041 A1 | 6/2019 | Hill | |
| 2019/0244214 A1 | 8/2019 | Flores et al. | |
| 2020/0151735 A1* | 5/2020 | Patil | .................. G06Q 30/0185 |
| 2021/0241288 A1 | 8/2021 | Doreswamy et al. | |

FOREIGN PATENT DOCUMENTS

| | | | | |
|---|---|---|---|---|
| JP | 2004524599 A | * | 8/2004 | ............... G07F 7/08 |
| WO | WO-2019157114 A1 | * | 8/2019 | ........... G06Q 20/407 |

OTHER PUBLICATIONS

Vozza, Stephanie: Recurring Refunds: How Retailers Can Deal with "Serial Returners", Jan. 22, 2019, Shopify, pp. 1-12 (Year: 2019).*
Prisha et al.: Identity Risk Analysis in Mobile Commerce: A Novel Approach, 2018, IEEE, pp. 185-190. (Year: 2018).*
"U.S. Appl. No. 17/152,064, Final Office Action mailed May 11, 2023", 22 pgs.
"U.S. Appl. No. 17/152,064, Non Final Office Action mailed Dec. 2, 2022", 16 pgs.
"U.S. Appl. No. 17/152,064, Notice of Allowance mailed Jul. 26, 2023", 8 pgs.
"U.S. Appl. No. 17/152,064, Response filed Mar. 2, 2023 to Non Final Office Action mailed Dec. 2, 2022", 10 pgs.
"U.S. Appl. No. 17/152,064, Response filed Jul. 11, 2023 to Final Office Action mailed May 11, 2023", 9 pgs.

* cited by examiner

SELF-SERVICE TERMINAL (SST) ITEM RETURN ANTI-FRAUD PROCESSING

CROSS-REFERENCE TO RELATED APPLICATION

This application is a continuation of U.S. patent application Ser. No. 17/152,064, filed Jan. 19, 2021, which application and publication is incorporated herein by reference in its entirety.

BACKGROUND

Retailers struggle managing the returns process in their stores. Key challenges include staffing the customer returns desk to ensure a good customer experience; providing a favorable customer experience during returns since it is one of the longest and most important interactions between stores and their customers with a major impact on brand loyalty; handling the disposition of the returned item; and limiting retail fraud (which is substantial with returned items).

Furthermore, item return procedures are typically the same for any returned item regardless as to whether some items are more likely to being associated with fraudulent returns than other items and regardless as to whether an expense associated with the staff processing a particular item return is greater than just accepting the corresponding item with or without a modified returns procedure by the retailer.

In fact, hassling a customer over an item priced at only a few dollars in order to follow the existing returns process when the customer is a loyal customer can be very detrimental to the reputation of the retailer. Staff time in processing the return can cost the retailer more than just simply accepting the return with little to no questions asked. However, staff often lack any authority to override the existing process, which usually requires a manager's approval. Long customer queues are not uncommon at returns desks, which can require additional staff to address and which does frustrate the retailer's customers.

There is no existing technology available in the industry that addresses these challenges even though item returns consume a substantial amount of a retailer's resources and even though item returns are associated with significant retail fraud.

SUMMARY

In various embodiments, methods a system for Self-Service Terminal (SST) item return anti-fraud processing are presented.

According to an embodiment, a method for SST item return anti-fraud processing is presented. An item associated with an item return transaction is identified and an item image is obtained for the item as provided by a transaction terminal that is processing the item return transaction. The item is authenticated based on an item code for the item and the item image. Transaction history data associated with the item, a customer associated with the item return transaction, and a store associated with the item return transaction are obtained. A fraud score is calculated based on the transaction history data and an item return rating for the customer is obtained. A determination is made based on the fraud score and the item return rating whether the item return transaction can complete without assistance at the transaction terminal or whether the item return transaction is to be suspended for assistance and an audit.

DETAILED DESCRIPTION

Figure 1A:
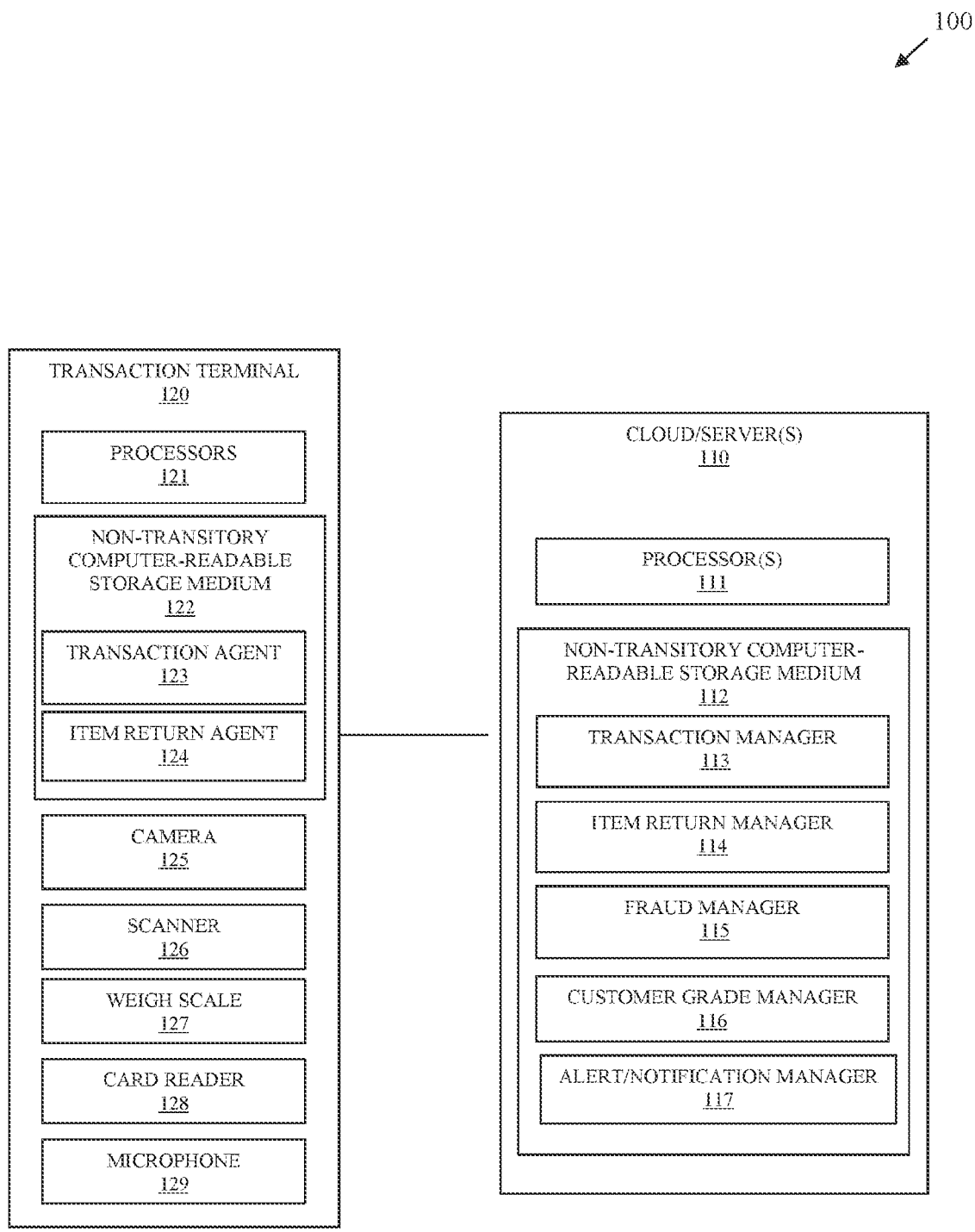
FIG. 1A is a diagram of a system for SST item return anti-fraud processing, according to an example embodiment.

FIG. 1A is a diagram of a system for SST item return anti-fraud processing, according to an example embodiment. It is to be noted that the components are shown schematically in greatly simplified form, with only those components relevant to understanding of the embodiments being illustrated.

Furthermore, the various components (that are identified in architecture 100) are illustrated and the arrangement of the components are presented for purposes of illustration only. It is to be noted that other arrangements with more or less components are possible without departing from the teachings of SST item return anti-fraud processing, presented herein and below.

System 100 provides techniques by which a customer can perform an item return at an SST without requiring any assistance. The returned item(s) can be deposited in a bin adjacent or affixed to the SST. The item is inspected using computer vision analysis and sensor data provided from sensors associated with the SST (such as item weight). A plethora of data is analyzed to determine in real-time whether the returned item is legitimate and whether the item return itself is legitimate. The data can include transaction and return data for the local store associated with the SST, retail transaction data and return data for the retailer as a whole who is associated with the local store, feature attributes of the images taken of the item (including size, dimension, predominate color, etc.), customer transaction and return data, most-recent customer transaction and return data, a fraud history associated with the returned item, a weight of the returned item as noted by a weigh scale of the SST, and any existing customer item return score or grade maintained for the customer. The data is analyzed to produce a fraud score and the fraud score is used to determine whether the item return can proceed through self-service operation of the SST by the customer or whether a notification needs to be sent for intervention and assistance during the item return transaction. Based on the fraud score for the item return, a maintained customer item return score or grade is updated (or created if this was a first item return being performed by the customer with the retailer).

Many different embodiments of the above-noted techniques are presented herein and below.

As used herein and below, the term "operator" refers to a customer or retail staff interacting with interfaces of a device. A "device" refers to any device processing the interfaces for which an operator interacts with during an item return.

The terms "staff," "staff member," "user," "customer," "consumer," "personnel," "actor," "person," "individual," and "clerk" may be used interchangeably and synonymously with the term "operator."

A "transaction terminal" is a type of device that is used to perform transactions (purchases and returns), which includes a variety of integrated peripheral devices or which is interfaced to peripheral devices. The peripheral devices comprise card readers, currency/coin acceptors and dispensers, scanners, weigh scales, integrated scanners with weigh scales, touch displays, cameras, etc.

In an embodiment, when the operator is a staff member of a store, the transaction terminal is a Point-Of-Sale (POS) terminal.

In an embodiment, when the operator is a customer, the transaction terminal is an SST.

It is noted that in some cases, the transaction terminal may be a mobile device that is interfaced to over a wireless connection peripheral devices, such as integrated scanners with weigh scales, scanners, weigh scales, card readers, etc. The mobile device may be a specialized device provided by the store to the customer, a customer device with a specialized mobile application, or a staff member device. The mobile device may be a phone, a laptop, a tablet, or a wearable processing device.

For purposes of the discussion that follows, the transaction terminal 120 is described within the context of an SST operated by the customer during a self-item return transaction with a retailer at the retailer's store. However, it is to be noted that in other embodiments, the transaction terminal 120 may be any of the above-noted devices.

System 100 comprises a cloud/server 110 and a transaction terminal 120.

Cloud/Server 110 comprises at least one processor 111 and a non-transitory computer-readable storage medium 112. Medium 112 comprises executable instructions for transaction manager 112, item return manager 114, fraud manager 115, customer grade manager 116, and alter/notification manager 117. The executable instructions when provided to processor 111 cause processor 111 to perform the processing described herein and below with respect to 113-117.

Transaction terminal 120 comprises at least one processor 121 and a non-transitory computer-readable storage medium 122. Medium 122 comprises executable instructions for transaction agent 123 and item return agent 124. The executable instructions when provided to processor 121 cause processor 121 to perform the processing described herein and below with respect to 123-124.

Optionally, each or some of transaction terminals 120 may include integrated peripheral devices, such as camera 125, scanner 126, weigh scale 127, payment/gift/loyalty card reader 128, and microphone 129.

In some embodiments, camera 125 and microphone 129 may be separate stand-alone network appliances that provide images and audio from objects and persons during item returns at a given transaction terminal 120. So, cameras 125 and microphones 129 need not be integrated into any given transaction terminal 120. But there may be a plurality of different types of transaction terminals 120, such that some devices 120 include integrated cameras 125 and microphones 129 while other devices 120 lack 125 and 129 and are optionally being monitored by a network-based cameras 128 and/or microphones 129.

Additionally, scanner 126 may be integrated with weigh scale 127 for a combined peripheral device.

Furthermore, as referenced above, terminal 120 may be a mobile device that interacts with standalone peripheral devices over wireless connections.

Figure 1B:
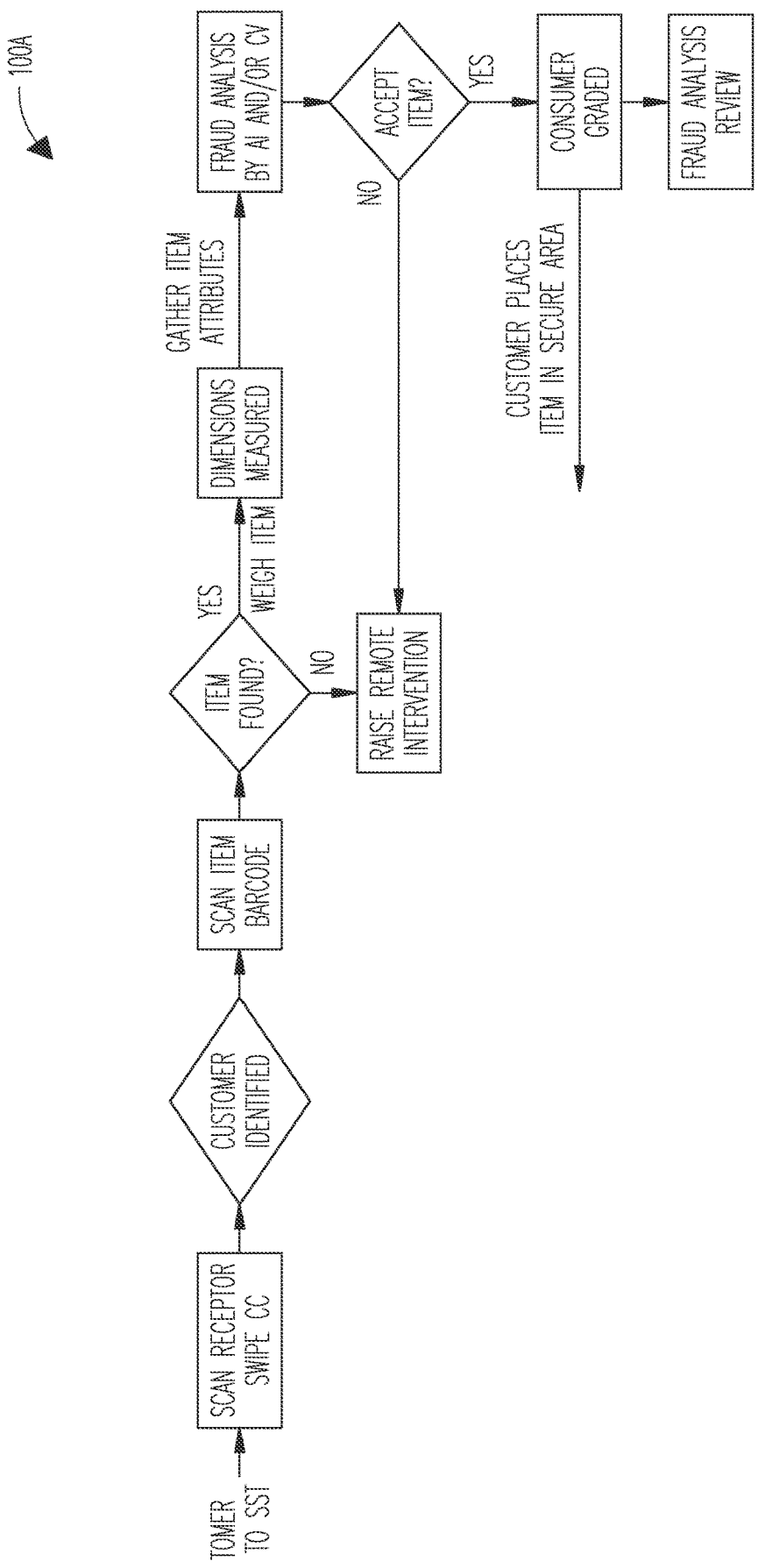
FIG. 1B is a diagram of a method using the system of FIG. 1A for SST item return anti-fraud processing, according to an example embodiment.

FIG. 1B is a diagram of a method 100A using the system of FIG. 1A for SST item return anti-fraud processing, according to an example embodiment.

During operation of system 100 (beginning at the left in FIG. 1B and continuing from left to right), a customer enters a store and proceeds with one or more items to return to an SST 120. Transaction agent 123 identifies the customer through a variety of mechanisms using one or more peripheral devices 125-129 (various options for identification are discussed below with the FIG. 1C). A user-facing transaction interface is presented on a touch display of SST 120, and the user selects a self-return transaction, this causes transaction agent 123 to provide control for the self-return transaction to item return agent 124. Item return agent then renders various item return screens with guided instructions to the customer and the customer is asked to scan on item code on the item being returned using scanner 126 (not for a mobile device embodiment of terminal 120 the scanner may be an integrated camera of the mobile device).

Item return agent 124 contacts item return manager 114 over a network connection and requests that the item code be looked up and identified. The item information along with item pricing is returned from item return manager 114 to item return agent 124. Item return manager 114 may also interact via Application Programming Interface (API) calls with an inventory system for purposes of determining the total number of items in stock or whether the item is out of stock (it's also possible that the item is available in the store but there are no recorded sales for the item). If the item code is not found or there is no indication of the store having sold any of the items, Item return manager 114 sends a notice to item return agent 124 causing item return agent 124 to suspend the item return transaction. Item return manager 114 also sends a notice to a staff member to go to the SST 110 for inspection of the item being returned (identified as "Raise Remote Intervention" in FIG. 1B).

Assuming item return manager 114 identifies the item being returned and sends the item information and pricing to item return agent 124. Item return agent 124 may instruct the customer through the transaction interface to place the item on the weigh scale 127 for security checks.

Item return agent 124 notes the recorded weight provided by the weigh scale 127 and obtains images taken by one or more cameras 125 situated at different angles relative to the item on the weigh scale 127. The weight and images are obtained by item return manager 114 and Image analysis is performed on the image to calculate the item's shape, dimensions, size, edges, height, length, and/or width. The image analysis also provides a color attributes for the item, which may be a predominate color or a color signature calculated from the colors recorded in the images.

The weight, dimensions, and color signature of the item are compared against expected and known weight ranges, dimension ranges, and color signature for a model item. Item return manager 114 then determines based on this, whether the item is damaged or counterfeit (not what it was purported to be according to the scanned item code). Assuming the item is either badly damaged or is counterfeit, Item return manager 114 sends the self-item return transaction data, customer information, item information, customer item return grade, and calculated fraud score to alert/notification manager 117. Alert/notification manager 117 sends a notification or an alert to item return agent 124 and to a staff-operated devices or local-store systems. Responsive to the alert, item return agent 124 suspends the self-item return transaction preventing the customer from completing the self-item return transaction at the SST 120. A staff member is also dispatched to the SST 120 to intervene with customer assistance and to inspect/audit the item and the self-item return transaction.

Assuming the item being returned passes the weight, dimensions, and color signature security checks. Fraud manager 115 may perform additional data-driven fraud analysis utilizing customer transaction and return data, item transaction and return data associated with the store, item transaction and return data associated with the retailer as a whole, and/or an existing (if available item return grade associated with the customer). The item weight values, dimensions, and color signature along with the additional data is then processed to derive a fraud score by fraud manager 115. Item return manager 114 compares the calculated fraud score against a threshold or against a predefined range of values and item return manager 114 determines whether the item should be accepted for the self-item return transaction or whether intervention by a staff member is warranted to audit the self-item return transaction and the item being returned.

When the item manager 114 determines that the calculated fraud score authorizes the self-item return to proceed to completion by the customer at the SST 120, item return manager 114 notifies sends an authorization message of instruction to agent 124 and agent 124 renders in the transaction interface instructions where the customer is to place the item or where the item is to be taken if not at the SST 120.

The customer may be monitored via in-store cameras to ensure that the item was placed in a bin or a shoot associated with the SST 120 or was carried by the customer to the designated drop-off area of the store. At any time, through video analysis, it is determined that the customer attempts to exit the store with the item, a security system alert is raised, and security protocols are enforced according to store policy.

Item return manager 114 provides the fraud score and the self-item return transaction data to customer grade manager 116 for creating (if this is a first item that the customer has ever returned) or for updating (if this is at least a second item that the customer has returned) a customer item return grade/score. The updated grade/score is maintained with a customer profile of the customer.

Store rules may indicate that customers with a failing grade are not authorized to do self-item returns or in some cases no item returns at all. An okay grade may indicate that the customer is to be monitored during a self-item return transaction or that a threshold for the fraud score is to be lowered during self-item return transactions by the customer. An excellent grade may indicate that the threshold for the fraud score is high, such that if the item passes the weight, dimensions, and color signature tests/checks, it is unlikely evaluation of the additional transaction data would warrant a calculated fraud score requiring manual intervention for this type of customer. The item-return grade is a scalar value calculated by customer grade manager 116 along a predefined range of values and the item-return grade can be referenced within and processed within rules by item return manager 114 purposes of determining in real time whether a self-item return transaction can complete without staff assistance being required or whether a self-item return transaction requires staff intervention and audit.

Once the customer item-return grade is update or created (as discussed above), the self-item return transaction data for the self-item return transaction, the calculated fraud score (along with the item recorded weight, dimensions, and color signature), the updated customer item-return grade are stored in an audit record, which is linked to the transaction histories and the customer's transaction history. Video of the self-item return transaction may also be indexed to the audit record, such that short video clips can be accessed via links embedded in the audit record. The audit record may then be referenced if subsequent fraud was determined to have actually been present in the authorized self-time return transaction.

In an embodiment, the audit records determined subsequently to have been associated with fraudulent item returns can be used as input data to train a Machine-Learning Algorithm. The MLA can be trained on both known fraudulent returns and known non-fraudulent returns. The output of the trained MLA (once it has reached a desired accuracy level) may be used to determine whether a in-progress self-item return transaction is fraudulent requiring audit or whether the in-progress self-item return transaction is non-fraudulent and does not require any staff intervention.

In an embodiment, the MLA can be used as another data point by item return manager 114 to determine whether to halt or permit a self-item return transaction; so, manager 114 may utilize its configured thresholds, the calculated fraud score provided by fraud manager 115, the current item-return grade provided by customer grade manager 116, and a fraud confidence value provided as output from the MLA to determine whether a self-item return transaction should be suspended for staff audit or permitted to proceed without any staff assistance or review.

In an embodiment, a first MLA is trained to output the customer item-return grade and a second MLA is trained to output a fraud score, such that customer grade manager 116 is a first MLA and fraud manager 116 is a second different MLA. In an embodiment of this embodiment, a third MLA is trained to receive as input the customer grade outputted for a given item-return transaction by the first MLA and the fraud score outputted by the second MLA and produce as output a decision or a value to item return manager 114 for item return manager 114 to compare against a model value in determining whether a given item-return transaction can proceed without audit intervention or whether audit intervention is needed. In this manner, multiple trained MLAs may be chained together for purposes of making fraud determinations in real time for a self-item return transaction of the customer.

Figure 1C:
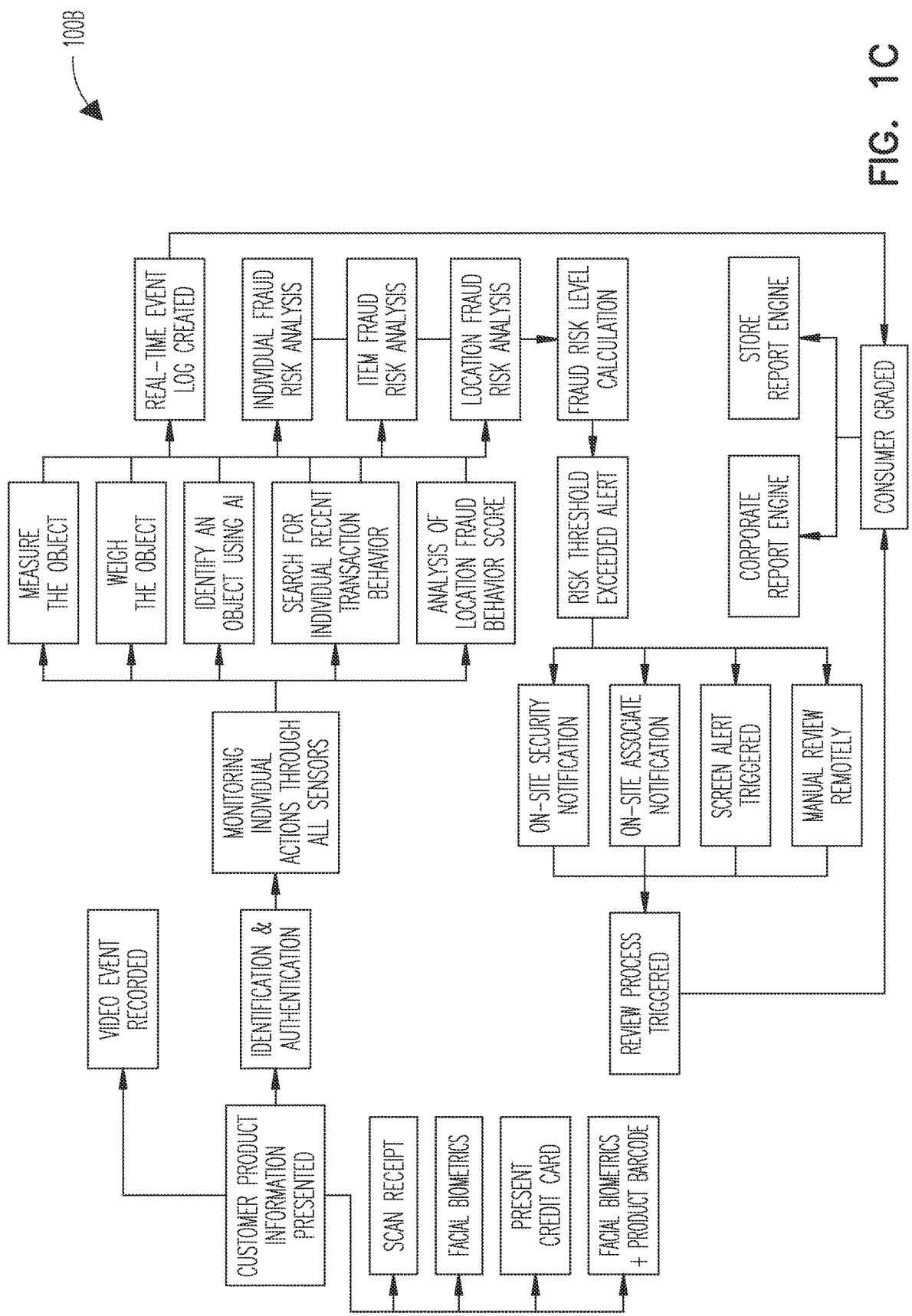
FIG. 1C is a diagram of another method using the system of FIG. 1A for SST item return anti-fraud processing, according to an example embodiment.

FIG. 1C is a diagram of another method 100B using the system of FIG. 1A for SST item return anti-fraud processing, according to an example embodiment.

Method 100B provides a variety of embodiments and enhancements from that which was discussed above with method 100A of FIG. 1B.

Again, the process flow starts with the customer being identified by transaction agent 123 on terminal 120 when the customer is at the terminal 120. A variety of mechanism permit identification of the customer and/or the transaction receipt associated with the item being returned. Scanner 126 and/or camera 125 may be used to scan a barcode or Quick Response (QR) code present on any customer-provided receipt. Transaction agent 123 can identify that the encoded information is associated with an already completed transaction, which indicates that the customer wants to perform an item-return transaction at terminal 120. Transaction agent 123 interacts with transaction manager 113 and identifies the original transaction record and passes control to item return agent 124 and item return manager 114. A customer identifier is associated with the transaction record, such that the customer is identified with scanning of the transaction receipt (at least it is assumed to be the customer).

In addition to as an alternative to original transaction receipt scanning, camera 125 may be used to identify facial features of the customer. Item return manager 114 calculates a hash value on the facial features and uses the hash value to search known hash values for those facial features in a registered customer facial features template data store for purposes of uniquely identifying the customer at terminal 120. Note that for performance enhancement in response times, item return agent 124 may calculate the hash value and provided to item return agent 124, such that the facial image does not have to be transmitted over a network connection to item return manager 114. It is also to be noted that other biometric identifications can be used in addition to or as an alternative to facial recognition, such as fingerprint recognition, palm recognition, digit lengths for digits of customer's hand, and/or a voice print. When voice identification is used, microphone 129 captures an audio sample (presented on a screen as instructions for the customer to repeat or audibly requested of the customer through a speaker of terminal 110) and similar to what was discussed above a hash or range of hash values are compared against voice templates to identify the customer.

In addition to or as an alternative to the original transaction receipt scanning and biometric identification, transaction agent 123 may read card data for a card presented by the customer at the terminal and provided to item return agent 124. The read card data comprises the customer name, which can be searched on my item return manager 114 for locating a customer profile or customer transaction records.

In addition to or an alternative to the original transaction receipt scanning, the biometric authentication, or the card-based authentication, item return agent 124 may uses a combination of biometric authentication along with scanning of an item bar code performed by the customer using scanner 126 and/or camera 125.

After identification is made of the customer and of the original transaction record associated with the item being returned, item return manager 114 may require (according to rules associated with the item, store, and/or customer) further identification as to the customer. This may entail utilizing a store authentication or security system which is provided the data gathered during identification and submitting challenges to the customer to respond with an appropriate credential (such as password, phrase, etc.).

The entire time period of the customer within the store and at terminal 120 is recorded and monitored by computer-vision and any abnormal behavior or unexpected behavior causes video events to be raised and recorded. For example, the customer may during the item return transaction pick the item off a surface of the terminal 120 and place the item in his/her pocket, bag, or purse instead of placing the item where instructed.

So, not only is the item authenticated via visual measuring of the item/object from images and through weight determination, but the actual behaviors and actions of the customer are also monitored while at the SST 120 and while within the store associated with the SST 120.

Item return manager 114 independently verifies the authenticity of the item being returned in addition to the identification of the item based on scanning and original transaction receipt information. The item is measured (height, length, width, size (dimensions) from the images, a weight is record as provided by weigh scale 127, recent customer transaction data is obtained from the customer's transaction history to identify recent behaviors of the customer, a current item-return grade for the customer is obtained, and fraud associated with the store (local store) and/or the item as a whole is obtained from transaction histories of the store and the retailer associated with the store. Fraud manager 115 calculates a current fraud score and the current fraud score along with the customer item-return grade is processed to determine a fraud risk level.

Item return manager 114 uses the fraud risk level to determine if a risk threshold for the customer (specific to the customer and the local store) is exceed or not. If the risk threshold is exceeded, item return manager 114 sends the appropriate information to alert/notification manager 117. Alert/Notification manager 117 then processes rules to alert the appropriate resources (human and automated). For example, on-site security may be initiated through an API call to the security system; a designated resource at the store may be sent a notification on his/her mobile device; item return agent 124 is instructed to render a message on the display of the SST 120 for the customer to please wait while assistance is obtained for the customer. In some cases, a remote video conference with a remote agent is established between the customer at the SST 120 and a remote staff member for assistance and auditing of the item and the item-return transaction.

The entire item-return transaction and all the collected data, decisions, scores, grades, video, audio, events are packaged in an audit log and updated to the retailer's data warehouse for subsequent review, mining, and reporting.

After a decision is made by item return manager 114 (either to permit the item-return transaction to continue and to complete with the customer operating the SST 120 or to suspend and require an in-person or remote video conference audit), the item-return transaction data, calculated fraud score, and decision made (to permit or not permit) is provided to the customer grade manager 117 where the current customer item-return grade is updated based on that information.

When the self-item return transaction is permitted to proceed or when it is permitted through manual override by a staff member (remote or in person at the SST 120), item return manager 114 process a refund for the item in a manner determined by store rules, customer profile, and/or customer selection. The refund can be cash dispensed at the SST 120, voucher printed or provided electronically, customer account credit, prepaid gift card (loaded at the SST 120 with the refund amount), credit to the original payment card account used to originally purchase the item based on the original transaction receipt, or other manners or methods (such as digital wallet transfers of credits, cash, and/or cryptocurrency).

System 100 and methods 100A and 100B permit self-item return transactions that are secure and efficient. Fraud is dynamically calculated based on factors specific to the customer, the local store, and the item being returned. Customers have item-return grades that are continuously updated based on customer behavior and transaction history. The item-return grades can be used in combination with calculated fraud scores to provide a customer and transaction specific determination as to whether an self-item return transaction may proceed without staff assistance or as to whether staff assistance is needed (assistance may be remote (through video conference) or may be on-site at the SST 120). The determinations made are in real time and are data driven. In addition, a variety of image-based (e.g., dimensions, size, color signatures, etc.) and sensor-based (e.g., weight, etc.) security checks are made to independently authenticate the item being returned; such that even when a given fraud score may not exceed a given risk threshold, the self-item return transaction may require staff intervention when the item being returned is unable to be independently authenticated. These techniques substantially streamline the return transactions for retailers and provide superior security, which retailers lack today with existing manual returns.

In an embodiment, system 100 may be deployed with a POS terminal 120 for purposes of authenticating and ensuring staff performing a return are not committing fraud or unwittingly participating in a fraud being perpetrated by a customer. Here, the system 100 is processed for assisted item-return transactions in addition to the self-item return transactions described above. In the assisted item-return transactions, alert/notification manager 117 may dispatch an onsite manager to audit the transaction or may establish a remote video session with a manager over a network connection to audit the transaction.

These and other embodiments are now discussed with reference to FIGS. 2-3.

Figure 2:
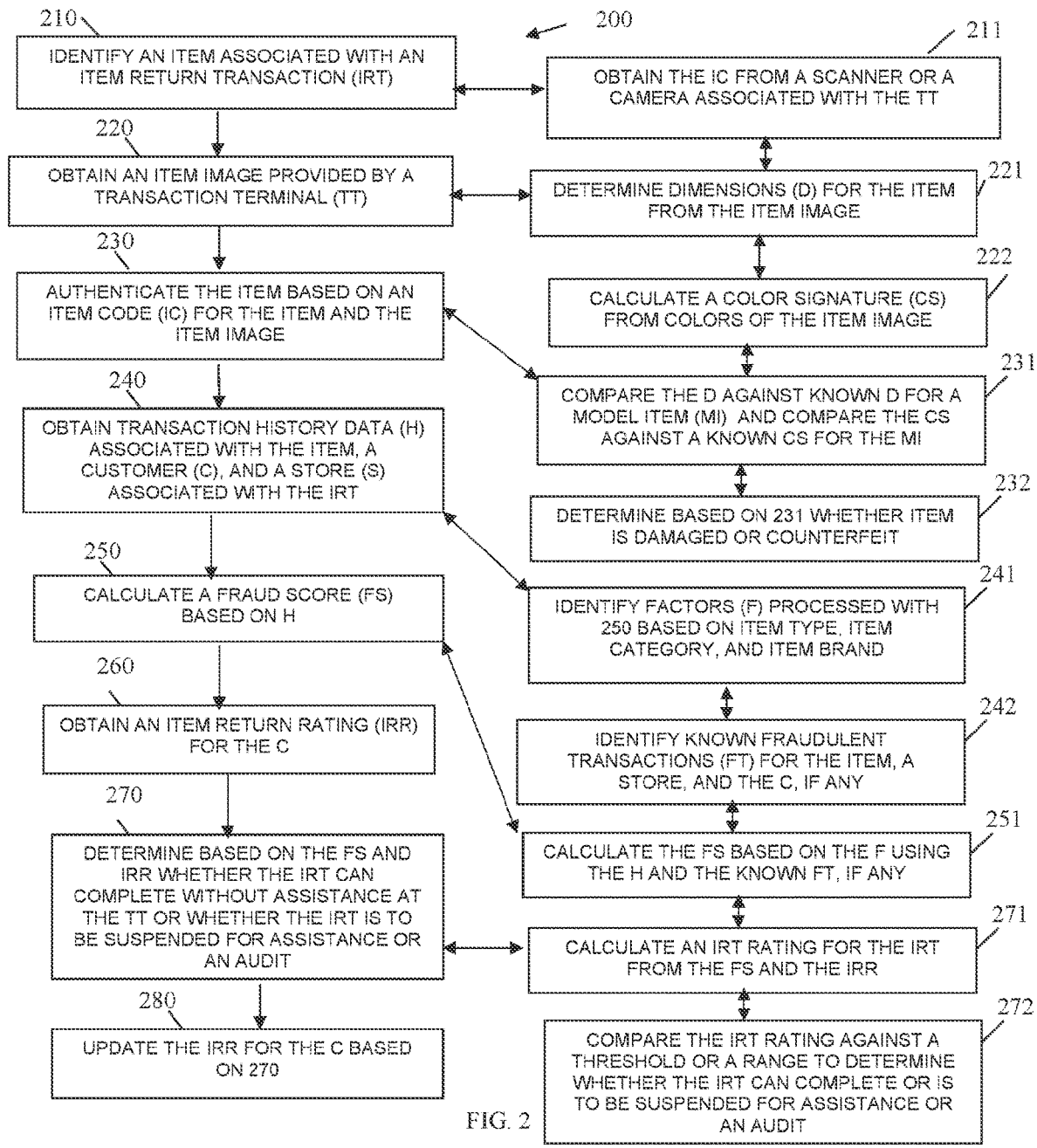
FIG. 2 is a diagram of a method for SST item return anti-fraud processing, according to an example embodiment.

FIG. 2 is a diagram of a method 200 for SST item return anti-fraud processing, according to an example embodiment. The software module(s) that implements the method 200 is referred to as an "return transaction fraud manager." The return transaction fraud manager is implemented as executable instructions programmed and residing within memory and/or a non-transitory computer-readable (processor-readable) storage medium and executed by one or more processors of one or more devices. The processor(s) of the device that executes the return transaction fraud manager are specifically configured and programmed to process the return transaction fraud manager. The return transaction fraud manager may have access to one or more network connections during its processing. The network connections can be wired, wireless, or a combination of wired and wireless.

In an embodiment, the device that executes the return transaction fraud manager is server 110. In an embodiment, server 110 is a cloud-based server comprised of a plurality of servers logically cooperating and accessible as a single server 110, a local-area network (LAN)-based server, or a wide-area network (WAN) server.

In an embodiment, multiple devices execute different portions of return transaction fraud manager. For example, some portions of the return transaction fraud manager execute on a cloud 110 while other portions of the return transaction fraud manager execute on one or more WAN or LAN servers 110. As another example, some portions of return transaction fraud manager execute on transaction terminals 120. In an embodiment, transaction terminals 120 may comprise, SSTs, POS terminals, or mobile devices (phones, tablets, laptops, wearable processing devices—as discussed above with the FIGS. 1A-1C).

In an embodiment, the return transaction fraud manager is all or some combination of 113-117, and/or 123-124.

At 210, the return transaction fraud manager identify an item associated with an item return transaction (a transaction for which at least one item is being returned by a customer).

In an embodiment, at 211, the return transaction fraud manager obtains the item code from a scanner or a camera associated with a transaction terminal.

At 220, the return transaction fraud manager obtains an item image provided by the transaction terminal (a camera interfaced to the transaction terminal).

In an embodiment of 211 and 220, at 221, the return transaction fraud manager determines dimensions for the item from the item image (e.g., height, length, width).

In an embodiment of 221 and at 222, the return transaction fraud manager calculates a color signature from colors of the item image. The color signature can include a predominate color or a score based on the colors and patterns of colors for the item.

At 230, the return transaction fraud manager authenticates the item based on an item code for the item and the item image captured at the transaction terminal.

In an embodiment of 221 and 230, at 231, the return transaction fraud manager compares the item dimensions against known dimensions for a model item associated with the item code and compares the color signature against a known color signature for the model item.

In an embodiment of 231 and at 232, the return transaction fraud manager determines based on the comparison whether the item is damaged or counterfeit (not the item it is purported to be by the item code). It is noted that if the item is determined to be counterfeit, then an alert is immediately sent to the transaction terminal and a staff member is dispatched to the transaction terminal. This may also be the case if the item is determined to be damaged, but the return may be permitted to the proceed if the damage is not extensive. In an embodiment, a damaged value may be used at 250 to calculate the fraud score in addition to the factors recited below.

At 240, the return transaction fraud manager obtains transaction history data associated with the item, a customer associated with the item return transaction, and a store associated with the item and the transaction terminal.

In an embodiment, at 241, the return transaction fraud manager identifies factors that are to be used to process the fraud score at 250 based on an item type for the item, an item category for the item within the item type, and an item brand for the item within the item category. That is, high-end or expensive items have different factors used from the transaction history data than do low-end and inexpensive items.

In an embodiment of 241 and at 242, the return transaction fraud manager identifies known fraudulent transaction for the item, the store, and the customer from the transaction history data, if any.

At 250, the return transaction fraud manager calculates a fraud score based on the transaction history data. The fraud score may also use an item damaged value as was discussed above at 232.

In an embodiment of 242 and 250, at 251, the return transaction fraud manager calculates a fraud score based on the factors using the transaction history data and the known fraudulent transactions (if any were present in the transaction history data).

At 260, the return transaction fraud manager obtains an item return rating for the customer. This is a scalar value calculated based on the customer's transaction history data associated with item returns. For instance, a count maintained for all item returns, which is weighted based on a time interval; store policy may indicate no more than 3 returns within a month, such that a most-recent three-month total may be 2 but the total returns for the customer within the past year were 10. In this case, the item return rating for the customer may permit a return but a weighted rating may be lowered because of the 10 total item returns.

At 270, the return transaction fraud manager determines based on the fraud score and the item return rating of the customer whether the item return transaction can complete at the transaction terminal without any staff assistance or whether the item return transaction is to be suspended for assistance or an audit (assistance or the audit may be at the transaction terminal and in person or remote via video conference between a remote agent and the customer at the transaction terminal).

In an embodiment of 251 and 270, at 271, the return transaction fraud manager calculates an item return rating for the item return transaction from the fraud score and the item return rating of the customer.

In an embodiment of 271 and at 272, the return transaction fraud manager compares the item return transaction rating against a threshold value or a range of values to determine whether the item return transaction can complete at the transaction terminal or whether the item return transaction is to be held in abeyance and suspended for assistance or an audit (in person or remote via a remote video session with the customer at the transaction terminal).

In an embodiment, at 280, the return transaction fraud manager updates the item return rating for the customer based on the decision made at 270.

Figure 3:
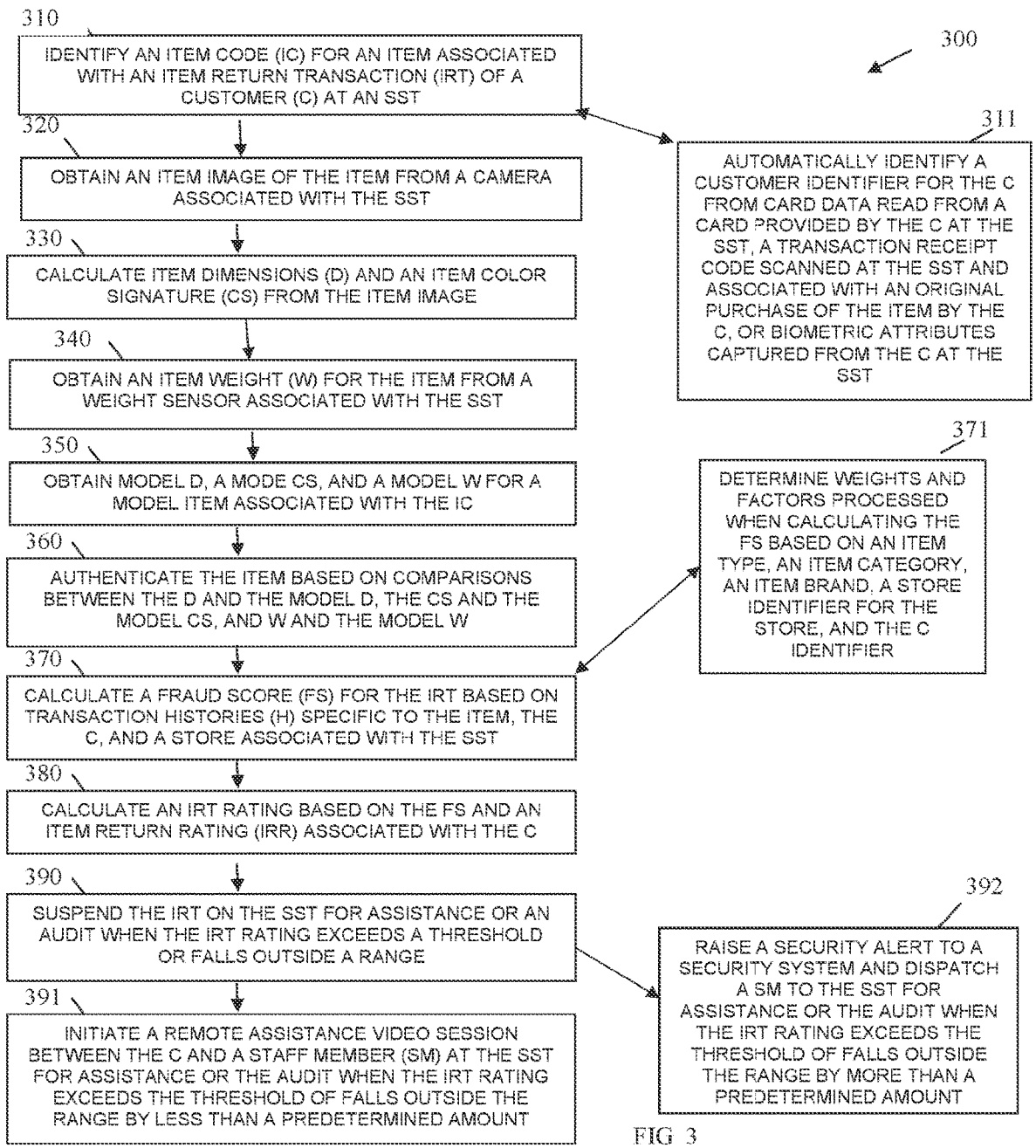
FIG. 3 is a diagram of another method for SST item return anti-fraud processing, according to an example embodiment.

FIG. 3 is a diagram of another method 300 for SST item return anti-fraud processing, according to an example embodiment. The software module(s) that implements the method 300 is referred to as an "item return security agent." The item return security agent is implemented as executable instructions programmed and residing within memory and/or a non-transitory computer-readable (processor-readable) storage medium and executed by one or more processors of a device. The processors that execute the item return security agent are specifically configured and programmed for processing the item return security agent. The item return security agent may have access to one or more network connections during its processing. The network connections can be wired, wireless, or a combination of wired and wireless.

In an embodiment, the device that executes the item return security agent is transaction terminal 120. In an embodiment, terminal 120 is an SST, a POS terminal, or a mobile device (as described above with the discussion of the FIGS. 1A-1C.

In an embodiment, the item return security agent is all of or some combination of 123-124.

The item return security agent presents another and, in some ways, enhanced processing perspective of the what was discussed above for transaction terminal 120.

At 310, item return security agent identifies an item code for an item associated with an item return transaction of a customer at SST of a store.

In an embodiment, at 311, the item return security agent automatically identifies a customer identifier associated with the customer from card data read from a card provided by the customer at the SST, a transaction receipt code (barcode or QR code) scanned at the SST and associated with an original purchase transaction of the item by the customer, or biometric attributes captured from the customer at the SST (as was discussed above with the FIGS. 1A-1C).

At 320, the item return security agent obtains an item image of the item from a camera. The camera may be associated with (integrated into or wirelessly interfaced to) the SST or the camera may be any networked-based camera within the store associated with the SST that has a field of view of the item at the SST to capture the item image. It is noted that there may be other cameras throughout the store from which the images are processed to maintain a video record or log of the customer's visit within the store. Image analysis may track both the customer and the item as well from the images.

At 330, the item return security agent calculates dimensions (height, length, width) and an item color signature from the item image.

At 340, the item return security agent obtains an item weight for the item from a weight sensor (weigh scale) associated with (integrated into or wirelessly interfaced to) the SST.

At 350, the item return security agent obtains model dimensions, a model color signature, and a model weight (or model weight range) for a model item that is linked or associated to the item code.

At 360, the item return security agent authenticates the item based on comparisons between the item's calculated dimensions and the item's model dimensions, and the item's obtained or read weight and the item's model weight or model weight range.

If the item is not successfully authenticated, then an alert may be sent to the SST that forces the item return transaction to be suspended and a staff member may be dispatched to the SST for an audit and customer assistance.

Assuming the item is authenticated, at 370, the item return security agent calculates a fraud score for the item return transaction based on transaction histories specific to the item, the customer, and a store associated with the SST.

In an embodiment, at 371, the item return security agent determines weights and factors processed when calculating the fraud score based on an item type, an item category, and item brand, a store identifier for the store, and the customer identifier for the customer.

At 380, the item return security agent calculates an item return transaction rating based on the fraud score and an item return rating associated with the customer.

At 390, the item return security agent suspends the item return transaction on the SST for assistance or an audit when the item return transaction rating exceeds a threshold value or falls outside a range of values.

In an embodiment, at 391, the item return security agent initiates a remote assistance video session between the customer and a staff member (remote agent) at the SST for assistance or the audit when the item return transaction rating falls outside the range by less than a predetermined amount. That is depending on the degree of deviation from what is considered to not require an audit and the item return transaction rating, a remote audit or remote assistance may be permitted.

In an embodiment, at 392, the item return security agent raises an alert to a security system and/or causes a staff member to be dispatched to the SST for assistance or the audit when the item return transaction rating exceeds the threshold or falls outside the range by more than a predetermined amount.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining, by a processor, item information corresponding to an item code of an item return transaction;
    verifying, by the processor, the item information corresponds to real-time information captured of a particular item presented at a self-service terminal (SST) by a customer for the item return transaction;
    wherein verifying further comprises:
        calculating a color signature for the particular item from at least one image of the particular item as a first portion of the real-time information;
        comparing the color signature against a known color signature obtained from the item information;
        calculating dimensions for the particular item from the at least one image of the particular item as a second portion of the real-time information; and
        comparing the dimensions against known dimensions obtained from the item information;
    calculating, by the processor, a fraud score for the item return transaction based on at least on the verifying;
    updating, by the processor, an item return rating maintained for the customer based on the fraud score;
    determining, by the processor, whether to suspend the item return transaction for an audit based on the updated item return rating and the fraud score;
    wherein determining further comprises:
        causing an agent processing on the SST to suspend the item return transaction when one or more of the fraud score and the updated item return rating suggest the item is a counterfeit item or a damaged item; and
    maintaining, by the processor, an audit log and a video log of the item return transaction at the SST.

2. The method of claim 1 further comprising, indexing and linking, by the processor, video clips from the video log to corresponding portions of the audit log.

3. The method of claim 2, wherein indexing and linking further comprises embedding links within the corresponding portions of the audit log to the video clips of the video log.

4. The method of claim 1 further comprising:
    obtaining, by the processor, first audit records from the audit log that are associated with actual fraudulent item return transactions at the SST;
    obtaining, by the processor, second audit records from the audit log that are associated with non-fraudulent item return transactions at the SST;
    training, by the processor, a machine learning model on the first audit records and the second audit records; and
    using predicted fraudulent and predicted non-fraudulent transactions produced as output by the machine learning model as a factor in the determining during subsequent in-progress item return transactions at the SST.

5. The method of claim 1, wherein verifying further comprises providing the item information and the real-time information as input to a first machine learning model, and wherein calculating further includes obtaining the fraud score as output from the first machine learning model.

6. The method of claim 5, wherein updating further comprises:
    providing the fraud score as input to a second machine learning model; and
    obtaining the updated item return rating as output from the second machine learning model.

7. The method of claim 6, wherein determining further comprises:
    providing the fraud score and the updated item return rating as input to a third machine learning model; and
    receiving a decision indicating whether the item return transaction is to be suspended for the audit or not as output from the third machine learning model.

8. The method of claim 1, wherein verifying further comprises:
    obtaining an item weight for the particular item as a portion of the real-time information; and
    comparing the item weight against a known weight obtained from the item information.

9. The method of claim 8, wherein calculating the item return rating further comprises comparing the item return rating against a threshold or a range to determine whether the item return transaction can complete or is to be suspended for assistance or an audit.

10. A method comprising:
    comparing, by a processor, real-time information calculated for an item during an item return transaction of a customer at a self-service terminal (SST) against item information obtained from a transaction receipt associated with the customer;
    wherein comparing further comprises:
        calculating a color signature for the item from at least one image of the item as a first portion of the real-time information;
        comparing the color signature against a known color signature obtained from the item information;
        calculating dimensions for the item from the at least one image of the item as a second portion of the real-time information;
        comparing the dimensions against known dimensions obtained from the item information; and
        calculating, by the processor, a fraud score for the item return transaction based on the color signature and the dimensions;
    suspending, by the processor, the item return transaction when the comparing indicates the item is a counterfeit item or a damaged item based at least on the fraud score;
    updating, by the processor, an audit log for the item return transaction and an item return rating maintained for the customer based on the comparing and the suspending; and
    embedding, by the processor, links to video clips from a video of the item return transaction within corresponding portions of the audit log;
    wherein suspending further includes:
        causing an agent processing on the SST to suspend the item return transaction when one or more of the fraud score or an item return rating suggests the item is the counterfeit item or the damaged item.

11. The method of claim 10, wherein comparing further comprises identifying and obtaining the transaction receipt based on a code scanned by the customer at the SST.

12. The method of claim 10, wherein comparing further comprises identifying and obtaining the transaction receipt based on a transaction history associated with the customer and an image captured of the item at the SST.

13. The method of claim 11, wherein identifying and obtaining further comprises identifying the customer from a customer image of the customer at the SST.

14. The method of claim 10, wherein comparing further comprises
obtaining a current item return rating maintained for the customer, calculating a current fraud score for the item return rating based at least on the real-time information in view of the item information; and
updating the item return rating from the customer based on the fraud score.

15. A system, comprising:
a server;
a terminal;
a camera;
the terminal configured to perform first operations comprising:
providing real-time information at least including images of a customer and of an item presented by the customer at the terminal during an item return transaction at the terminal, wherein the images obtained from the camera;
providing the real-time information to the server during the item return transaction; and
suspending the item return transaction based on an instruction provided by the server; and
the server configured to perform second operations comprising:
identifying a transaction receipt associated with the customer based on the real-time information;
obtaining item information for a candidate item that comports with the real-time information and the transaction receipt;
verifying the item information corresponds to the real-time information;
wherein verifying further comprises:
calculating a color signature for the item from at least one image of the item as a first portion of the real-time information;
comparing the color signature against a known color signature obtained from the item information;
calculating dimensions for the item from at least one image of the item as a second portion of the real-time information; and
comparing the dimensions against known dimensions obtained from the item information;
calculating a fraud score for the item return transaction based on the verifying;
updating an item return rating maintained for the customer based on the fraud score;
determining whether to send the instruction to suspend the item return transaction to the terminal based on the fraud score and the updated item return rating;
wherein determining further comprises:
causing an agent processing on the terminal to suspend the item return transaction when one or more of the fraud score and the updated item return rating suggest the item is a counterfeit item or a damaged item;
updating an audit log for the item return transaction based on the calculating, the updating, and the determining; and
embedding links to video clips from a video of the item return transaction within corresponding portions of the audit log, wherein the video provided by the camera.

16. The system of claim 15, wherein the terminal is a Self-Service Terminal (SST) operated by the customer or a Point-Of-Sale (POS) terminal operated by a staff member on behalf of the customer during the item return transaction.

* * * * *